United States Patent [19]

Pearson

[11] Patent Number: 4,808,898
[45] Date of Patent: Feb. 28, 1989

[54] GRIPPER ASSEMBLY FOR ROBOT ARM

[76] Inventor: Keith Pearson, 450 Harvard Ave., No. 4D, Santa Clara, Calif. 95051

[21] Appl. No.: 102,994

[22] Filed: Sep. 30, 1987

[51] Int. Cl.[4] ............................................. G05B 19/42
[52] U.S. Cl. .................... 318/568; 318/599; 318/685; 901/38; 901/39
[58] Field of Search ...................... 318/568, 599, 685; 901/38, 39

[56] References Cited

U.S. PATENT DOCUMENTS

| | | | |
|---|---|---|---|
| 3,427,520 | 2/1969 | Oppedahl | 318/599 |
| 4,579,380 | 4/1986 | Zaremsky et al. | 901/33 |
| 4,680,523 | 7/1987 | Goumas et al. | 318/685 |
| 4,699,414 | 10/1987 | Jones | 901/38 |
| 4,707,013 | 11/1987 | Vranish et al. | 901/39 |

*Primary Examiner*—William M. Shoop, Jr.
*Assistant Examiner*—Saul M. Bergmann
*Attorney, Agent, or Firm*—Townsend and Townsend

[57] ABSTRACT

An improved gripper for attachment to a robot arm. The gripper system is a stand alone unit with its own controller and has a pair of fingers, both of which are movable in opposite directions. The controller is programmed to direct the operation of the gripper system in response to system input signals. The fingers are controlled by a mechanism for moving the fingers simultaneously in opposite directions with the driving power being supplied by a motor. Feedback from the motor or moving mechanism is provided to a servo mechanism which provides a power signal to the motor through an intermediate amplifier. The servo system compares an input signal from the controller to the feedback signal and causes the motor to move in an appropriate direction.

13 Claims, 7 Drawing Sheets

FIG._7A.
TEACH SUBROUTINE

FIG._7B.
RUN SUBROUTINE

GRIPPER ASSEMBLY FOR ROBOT ARM

Figure 7:
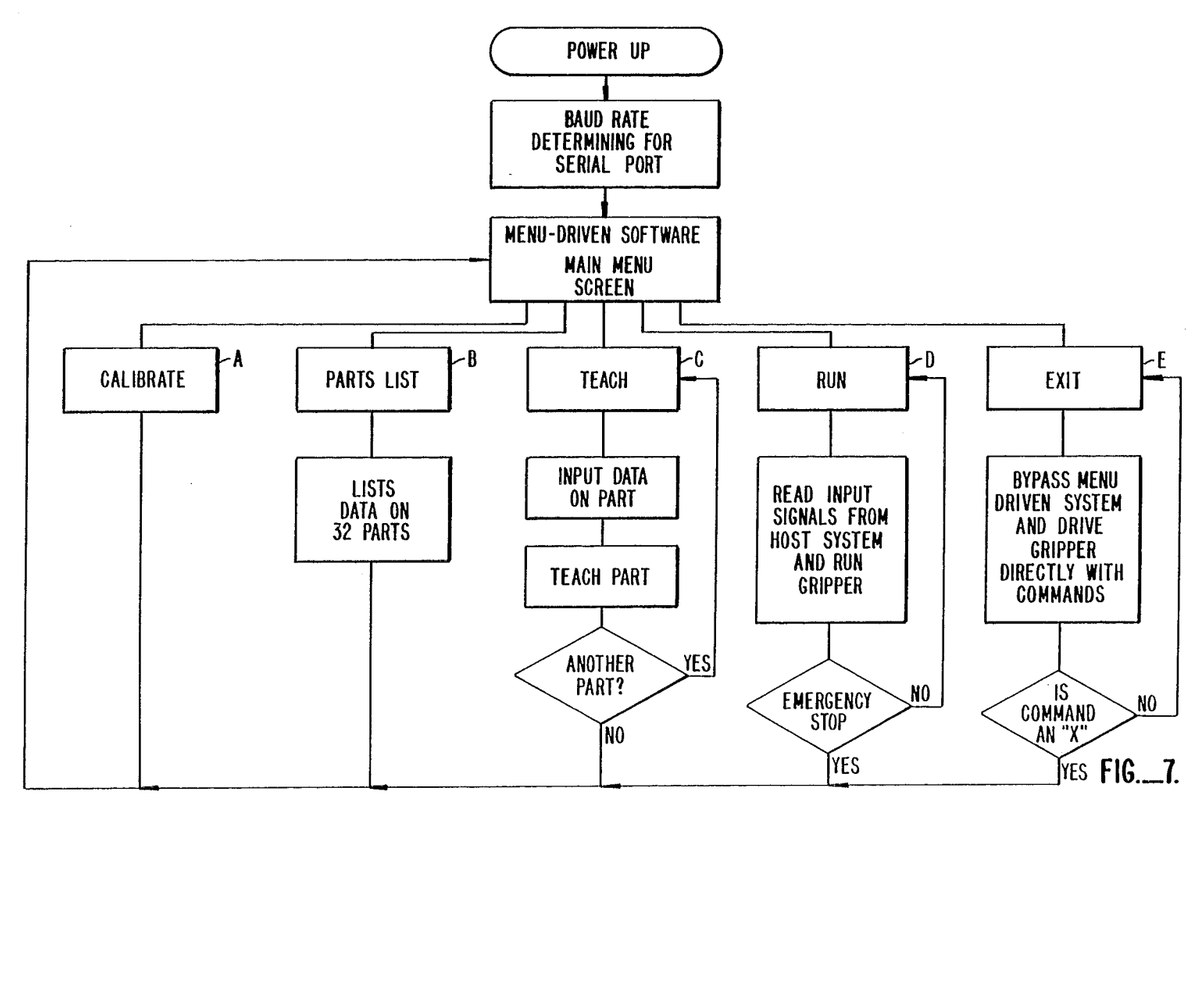
FIG. 7 is a flow chart, showing the functions of the robotic system of the present invention.

The appendix contains a listing of a computer program implementing the flow chart of FIG. 7.

This invention relates to improvements in the capability of robotic systems and, more particularly, to an improved gripper assembly having position-controlled finger mounts for gripping components of different types and sizes.

BACKGROUND OF THE INVENTION

Robots which are used to move and manipulate parts are typically comprised of a robotic arm having a gripper at the end thereof. The robotic arm is typically moved to position the gripper around the object to be grasped, and the gripper is then activated to grasp the object and hold it during movement of the robotic arm. Typically, such grippers are pneumatic. The gripper will typically have a full open position and will close with a constant amount of force upon the application of air pressure. Such pneumatic systems are usually limited in the amount of travel of the gripper fingers, with one inch being average. The gripper would close until the two fingers touch each other except for the intermediate contact with the object to be moved.

In a gripper previously sold by applicant, the gripper has a stationary finger and a moveable finger. The movable finger is controlled by a DC motor to position the finger as desired. An encoder on the shaft of the DC motor provides a feedback signal to a servo system which controls power to the DC motor. The system includes a serial port for providing assembly level commands to the servo system. The commands can be provided to the servo system of the gripper by the computer system controlling the robotic arm. The servo system output is coupled to the DC motor power supply through a linear analog amplifier. The motor is coupled to control the movable finger through a rack and pinion in one model or a ball screw and rack in another model.

SUMMARY OF THE INVENTION

The present invention is an improved gripper for attachment to a robot arm. The gripper system is a stand alone unit with its own controller and has a pair of fingers, both of which are movable in opposite directions. The controller is programmed to direct the operation of the gripper system in response to system input signals. The fingers are controlled by a mechanism for moving the fingers simultaneously in opposite directions with the driving power being supplied by a motor. Feedback from the motor or moving mechanism is provided to a servo mechanism which provides a power signal to the motor through an intermediate amplifier. The servo system compares an input signal from the controller to the feedback signal and causes the motor to move in an appropriate direction.

The two moving fingers of the gripper of the present invention provide increased flexibility for a robotic system. The controller allows the gripper unit to be a turn key device which can be controlled simply through menu driven software on an associated terminal or other input means.

Two embodiments are shown for simultaneously moving both fingers in opposite directions. In a first embodiment, a pinion is coupled to the drive shaft of the motor and mounted between two racks. The pinion causes the racks to move in opposite directions, with one rack being coupled to a first finger and the other rack being coupled to a second finger.

In a second embodiment, a drive shaft coupled to the motor has a ball screw mounted on it which is connected to a first rack coupled to a first finger. The first rack is coupled through an intermediate pinion to a second rack which is coupled to the second finger. Thus, movement in opposite directions is generated through the combination of a ball screw and rack and pinion arrangement.

The gripper system can be operated either via a terminal or a remote control box. The remote box can be carried by an operator to a position adjacent the gripper for teaching the gripper the size of a component to be moved. Control of the system is transferred to the remote control by the movement of a switch on the box. The operator can then use other switches to directly move the gripper fingers in one direction or the other or can use a switch to disconnect the motor so that the operator can manually move the fingers to the desired position for gripping the part. The operator physically pushes the fingers to the desired position and then hits a return button on a terminal to store the position.

In the preferred embodiment, the feedback mechanism is an encoder coupled to the motor drive shaft This encoder provides a square wave proportional to the position of the drive shaft. The square wave is provided as an input to the servo system which compares the position represented by the square wave to a desired position input by the controller. The servo system an analog output to a pulse width modulated pWM amplifier. The PWN amplifier converts the analog servo signal into digital form for performing pulse width modulation of an output signal. The output signal is filtered to give an analog output which is provided to the DC motor.

Different sizes and shapes of parts can be taught to the gripper using the remote control box. The operator first inputs a part number into the system and then uses the remote control box to position the gripper fingers on the object with the proper amount of force. Then, by simply hitting the return button on a terminal, the system will store the desired gripping position in association with the designated part number. The gripper position itself includes a force component since a greater force will translate into a slightly different position of the gripper fingers. Thereafter, in a run mode, the gripper will move to a position it has been "taught" when the designated part number is specified. The speed of movement of the fingers can be separately programmed to vary the time for which the gripping force is applied to the object to be moved.

The present invention thus provides an improved gripper system with increased flexibility and capabilities. The system can also be used to verify the proper size of an object to be moved by comparing the position in which the fingers stop (indicating contact with the object) with the desired position of the gripper arms.

Other objects of this invention will become apparent as the following specification progresses, and with reference to the accompanying drawings for an illustration of several embodiments of the invention.

DETAILED DESCRIPTION OF THE PREFERRED EMBODIMENTS

Figure 1:
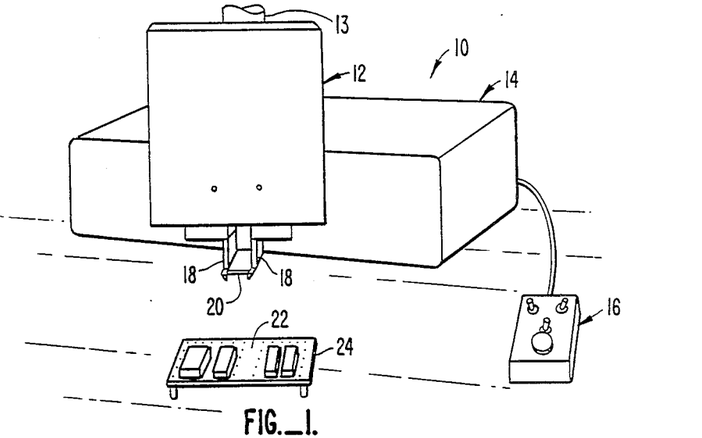
FIG. 1 is a perspective view of the robotic system of the present invention, showing the way in which the system can be used, for instance an application of placing a component on the board in a specific location on a circuit board.

The robotic system of the present invention is broadly denoted by the numeral 10 and includes a first embodiment of a servo gripper 12 coupled with a controller 14 operated by a remote control means 16 having a number of operating devices, such as switches, thereon. The servo gripper includes a pair of spaced fingers 18 which are driven laterally by the mechanism of gripper 12 so as to perform a certain function, such as to grip and lift a component 20 at one location and move it to a second location, such as at a specific location 22 on a circuit board 24 positioned on a surface, such as a table top or the like. Gripper 12 is coupled to a robot arm 13 and is moved about by the arm 13 under the influence of control means (not shown) for arm 13. Controller 14 is typically mounted with the controls for the rest of the robotic system.

Gripper 12 may have a programmable gripping force exerted by fingers 18 so as not to damage the component 20, yet the force will be sufficient to retain the component clamped by the fingers while the component is being moved from one place to another. Moreover, gripper 12 can be programmed to grip and carry a component of any size within a predetermined range. Such components can be of any desired configuration, such as rectangular or circular.

Figure 2:
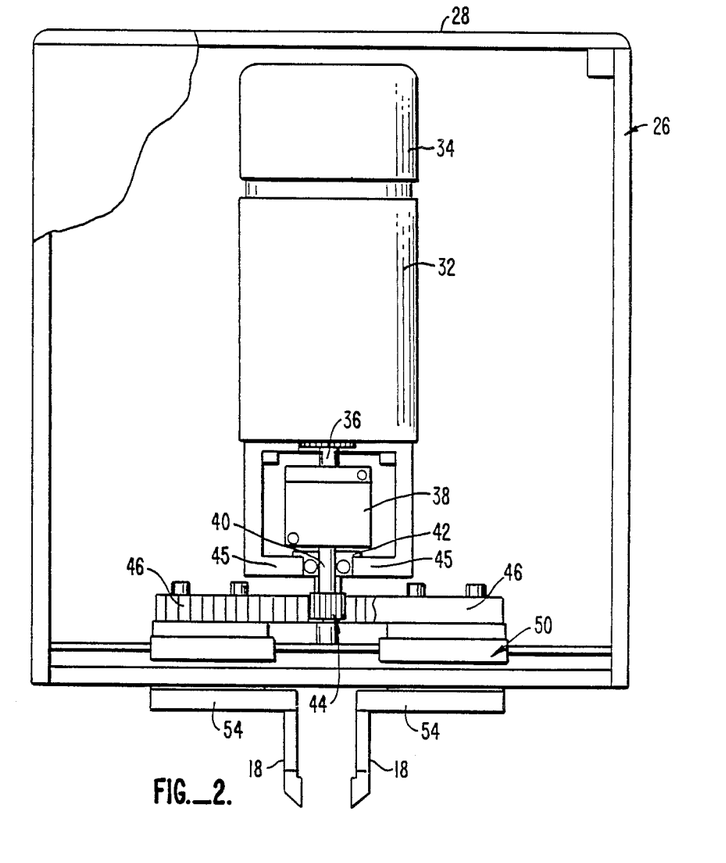
FIG. 2 is a front elevational view of one embodiment of the servo gripper of the present invention, the gripper being partially broken away to illustrate details of construction.
Figure 3:
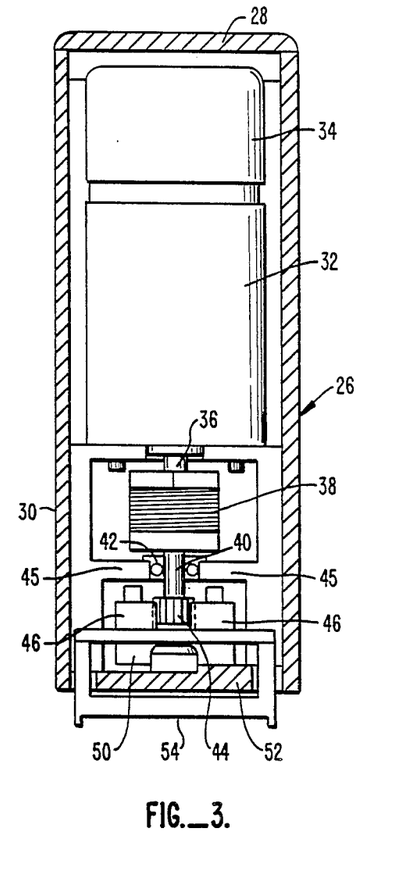
FIG. 3 is a vertical section looking in the direction of one and of the servo gripper of FIG. 2.

A first embodiment of servo gripper 12, using a rack and pinion arrangement is shown in FIGS. 2 and 3. The gripper 12 is enclosed in a housing 26 which includes a top plate 28 and a side cover 30 which can be opened to gain access to the interior of housing 26.

Within housing 26 is a DC motor 32 on which is mounted an encoder 34, the encoder being responsive to and coupled to one end of the drive shaft of the motor. For purposes of illustration, the motor drive shaft is vertical. The opposite end 36 of the drive shaft of motor 32 extends downward from the motor and is secured to a shaft coupling 38 having a lower stub shaft 40 which is mounted and rotates in a bearing 42 and having a pinion 44 at the lower end thereof. Bearing 42 is carried by a pair of legs 45 forming a part of the overall support defined by housing 26, the legs 45 being spaced above a pair of gear racks 46 which are in mesh with and responsive to pinion 44.

A linear bearing 50 allows one-dimensional linear motion of gear racks 46 on a bottom plate 52 forming a part of housing 26 so that the gear racks can move in opposite directions with respect to each other in response to the rotation of pinion 44 under the influence of motor 32. A pair of finger mounts 54 are coupled with respective gear racks 46. Fingers 18 are secured to respective mounts 54 as shown in FIG. 2.

When the motor is energized to rotate its shaft in one direction, the pinion 44 rotates to cause movements of the racks 46 in directions to open or move fingers 18 apart. When the shaft of the motor is rotated in the opposite sense, the racks are moved in directions toward each other so as to move fingers 18 toward each other. The encoder 34 senses the rotation of the motor drive shaft and thereby provides the information necessary to position the fingers and set the proper force on the component 20 (FIG. 1) by fingers 18 when it is desired to lift the component and move it to another location, such as locations 22 on board 24.

Figure 4:
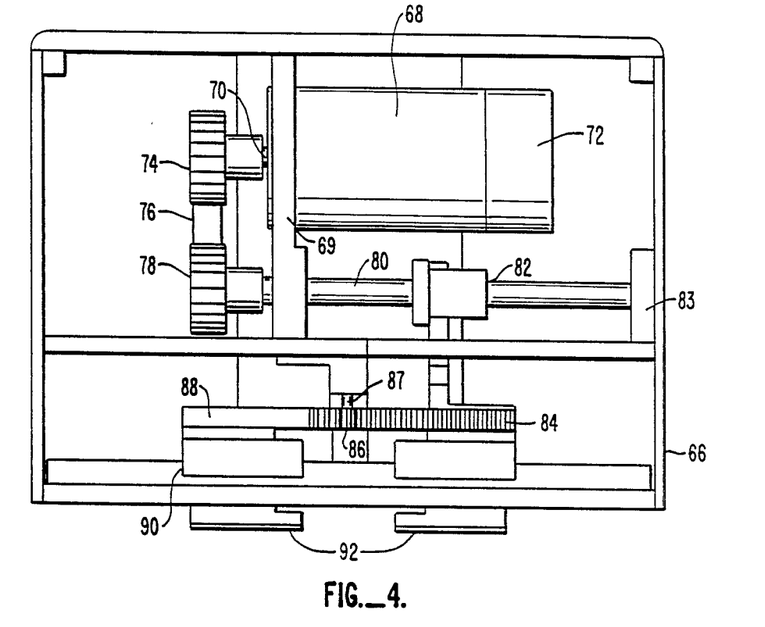
FIG. 4 is a view similar to FIG. 2 but illustrating a second embodiment of the servo gripper of the present invention.
Figure 5:
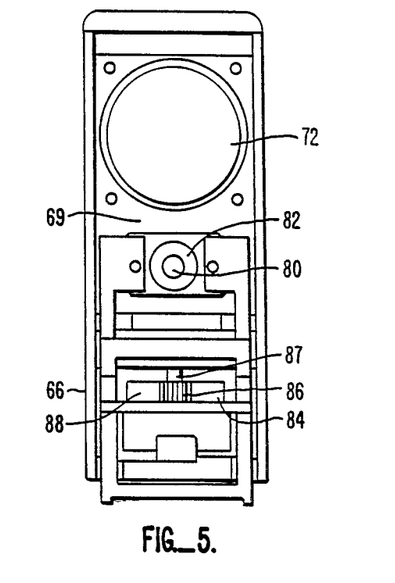
FIG. 5 is a view similar to FIG. 3 but showing the second embodiment of the servo gripper.

A second embodiment of the servo gripper of the present invention using a ball screw in combination with a rack and pinion arrangement is denoted by the numeral 60 and is shown in FIGS. 4 and 5. Gripper 60 includes a support housing 62 including a top plate 64 and a side cover 66 which is removable to gain access to the interior of the gripper when desired.

A DC servo motor 68 is mounted by a plate 69 in housing 62 in the manner such that its drive shaft 70 is, for purposes of illustration, generally horizontal. The drive shaft 70 is coupled at one end thereof to an encoder 72 and at the opposite end to a timing pulley 74 coupled by a timing belt 76 to a second timing pulley 78 coupled to a shaft 80 journaled in plate 69 and bearing 83. A ball screw 82 is mounted on shaft 80 for linear movement along the shaft.

The ball screw is coupled to a gear rack 84, which in turn is coupled to a pinion 86 secured to a vertical shaft 87 rotatably mounted on a fixed part of the support housing. A second gear rack 88 is in mesh with pinion 86 and is mounted for horizontal, linear movement with respect to housing 62. A linear bearing 90 couples gear racks 84 and 88 to support housing 62 so that, as the motor drive shaft 70 rotates, it causes movements of the gear racks 84 and 88 in opposite directions with respect to each other. Finger mounts 92 are coupled to respective gear racks 84 and 88 so that fingers, such as fingers 18, secured to mounts 92 will move toward and away from each other depending upon the direction of movement of the drive shaft 70 of servo motor 68.

Figure 6:
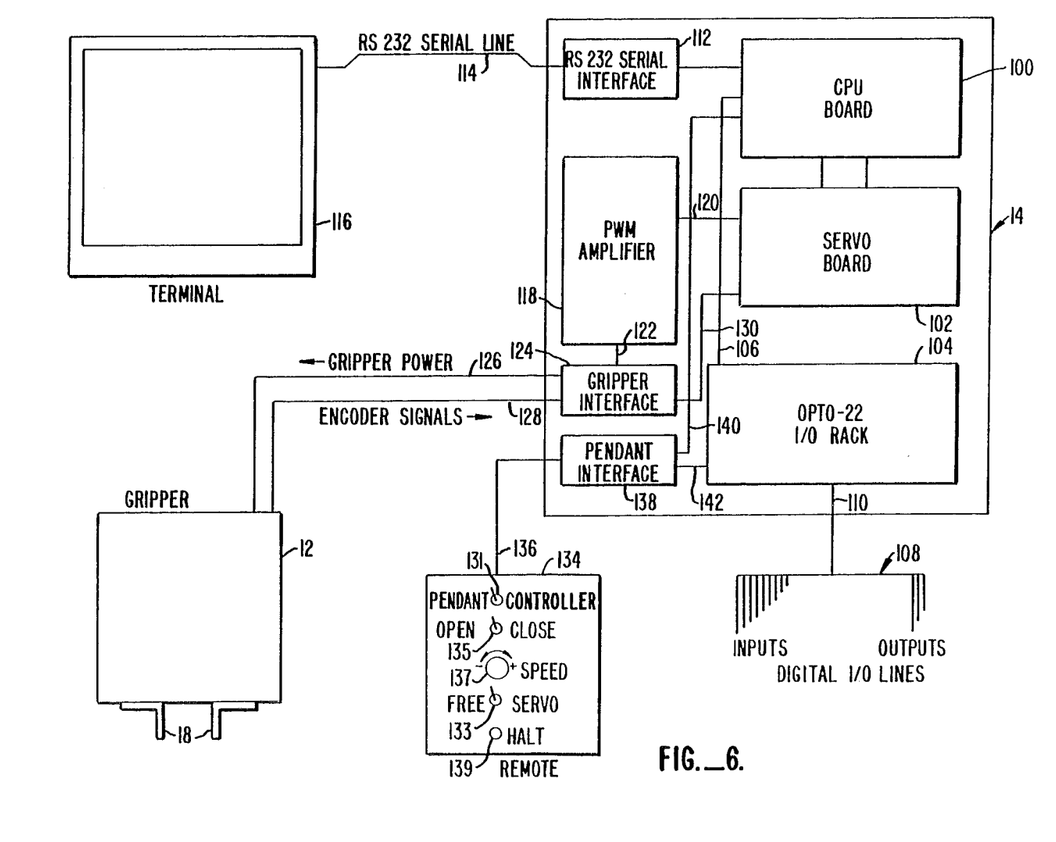
FIG. 6 is a block diagram of the robotic system of the present invention.

As shown in FIG. 6, controller 14 includes a CPU board 100 coupled to a servo board 102. An input/output rack 104 is coupled by line 106 to the CPU board, there being a group 108 of input and output lines coupled by line 110 to the input/output line of rack 104.

A serial interface 112 is coupled by a line 114 to a terminal 116. A power amplifier 118 is coupled by a line 120 to servo board 102 and by a line 122 to a gripper interface 124 whose output line 126 supplies gripper power to gripper 12 or to gripper 60, whichever is used. A line 128 carries encoder signals from encoder 34 or encoder 72 to gripper interface 124 which, in turn, directs such signal over a line 130 to servo board 102. A remote control box 134 is coupled by a line 136 to a pendant interface 138 which, in turn, is coupled by a line 140 to CPU board 100 and by a line 142 to input/output rack 104.

CPU board 100 contains an Intel 8052 microprocessor, 8K of random access memory (RAM), 8K of programmable read only memory (PROM) and an input-/output interface. The PROM contains the program for the gripper system. CPU board 100 can receive inputs from two sources, serial interface 112 or I/O rack 104. I/O rack 104 consists of a series of optically isolated interface buffers for coupling to input and output lines 108 which can be coupled to the main robot controller, a host computer, or a host programmable logic controller (PLC).

CPU board 100 controls servo board 102 which is preferably a DMC 3000 -10 chip set produced by Galil. The servo board receives the encoder signals in the form of a square wave pulse from gripper 112 through line 128 and a connector 120 on a line 130. This square wave pulse is compared with an input from CPU board 100 and an analog output is provided on line 120 to a pulse width modulated amplifier 118. PWM amplifier 118 is preferably a model 201 amplifier from Complex Controls. The output of the amplifiers is provided on line 122 through gripper interface connector 124 to a motor power line 126.

Remote control box 134 includes a first switch 131 for designating either pendant (remote control box) operation or controller operation. The controller operation position provides inputs to CPU board 100 through either serial interface 112 or parallel I/O rack 104. The pendant position puts CPU board 100 under the control of remote control box 134. A second switch 133 designates whether the gripper is to be operated in the free or servo mode. In the free mode, the signal from remote control box 134 causes CPU board 100 to remove power from the gripper motor so that an operator can manually move fingers 18 to a desired position. In the servo mode, the movement of the fingers is controlled by control box 134.

If the servo mode is selected, the operator will indicate the direction in which the fingers are to move with a switch 135. If the open position is chosen, the fingers will move away from each other, if the closed position is chosen, the fingers will move towards each other. The speed at which the fingers move is controlled by a dial 137 which the operator can manipulate to vary the speed at which the fingers move. A hold button 139 is provided as a fail safe to stop the movement of fingers 18.

FIG. 7 shows a flow chart illustrating the operation of the system 10 when serving to grip, lift and move components, such as component 20, in the manner shown in FIG. 1.

Four subroutines A-E, are shown in FIG. 7. Subroutine A is the calibration subroutine in which the controller instructs the motor to move so that the fingers close to determine the zero position. The position of the encoder at this closed position is then noted to provide the zero calibration.

In subroutine B, a list of parts to be manipulated by the gripper is input by an operator via terminal 116 of FIG. 6 or is down loaded from a computer system through input lines 108.

Figure 7A:
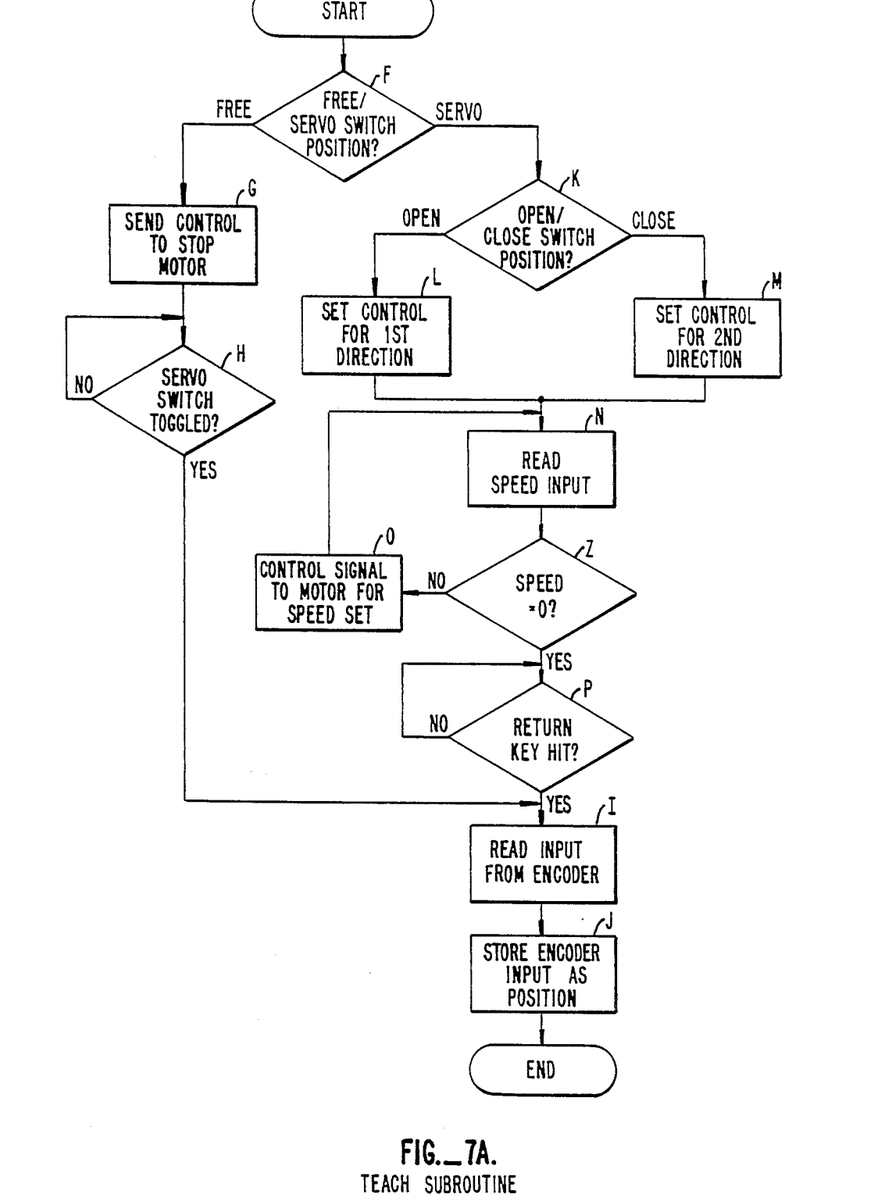
FIG. 7A is a flow chart of the teach subroutine of FIG. 7.
Figure 7B:
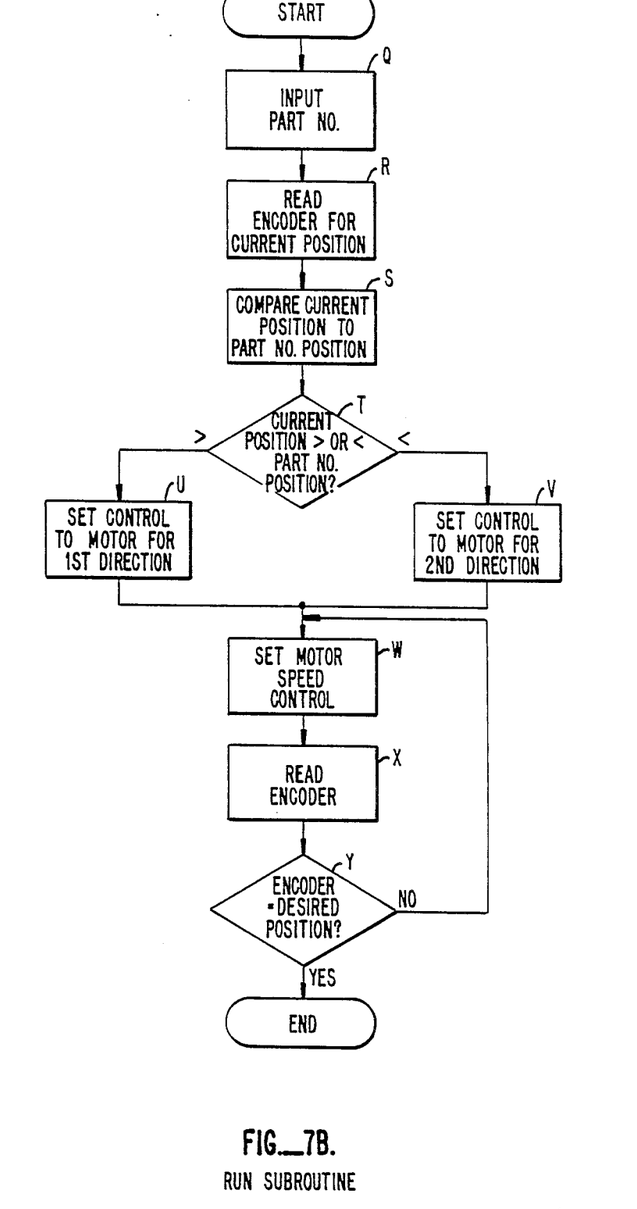
FIG. 7B is a flow chart of the run subroutine of FIG. 7.

Teach subroutine C and run subroutine D relate to teaching the system how to manipulate a part and subsequently manipulating that part, respectively. The details of these subroutines are shown in FIGS. 7A and 7B, respectively. Subroutine E allows the system to be controlled by a menu driven software on terminal 116 or directly with commands the I/O lines 108.

In the teach subroutine as shown in FIG. 7A, the controller first determines whether the free/servo switch is in the free or servo position (step F). If the switch is in the free position, a control signal is sent to stop the operation of the motor (step G). The system is then monitored to detect a toggling of the servo switch (step H) at which time the input from the encoder is read (step I) and the encoder input is stored as the grasping position for a previously designated part number (step J).

If the servo mode was selected, the controller then determines whether the open/close switch is in the open or closed position (step K). If the open position is designated, a control signal is sent through servo board 102 to drive the motor in a first direction (step L). If the switch is in the closed position, a different control signal is provided to servo board 102 to direct the motor to move in an opposite direction (step M). The input speed from control knob 137 is then read (step). A control signal is then sent through the servo board 102 to the motor to operate the motor at the designated speed (step O). If the speed is zero (step 2), the controller monitors for a return button on the terminal being hit (step P). If the return key has been hit, the encoder is read and its value is stored as the position for the designated part number (steps I and J).

Once the system has been taught a particular part, it can be run using the subroutine of FIG. 7B. A part number is first input (step Q) and the encoder is read to determine the current gripper position (step R). The current position is compared to the position stored in memory for the designated part number (step S) and the determination is made whether the current position is greater than or less than the desired position (step T). If the current position is greater, a first control signal is sent through servo board 102 to the motor to move the motor in a first direction (step U). If the current position is smaller than the desired position, a second control signal is sent through servo board 102 to move the motor in the opposite direction (step B). The controller then specifies a motor speed to servo board 102 in accordance with a speed designated by a previous input for the designated part number or a default speed (step W). The encoder is monitored (step X), and the motor is operated at the designated speed until the encoder position equals the designated position (step Y).

The subroutine of FIG. 7B can be varied in a number of respects. For instance, the encoder position may never reach the designated position in step Y if the part is out of tolerance. Thus, the controller can end the subroutine if no change in the encoder signal is detected for a certain amount of time, indicating that the fingers have contacted the part even though the desired position has not been reached. This position can then be compared to the designated position and an out of tolerance signal generated to terminal 116 if the difference is greater than a predetermined amount.

SYSTEM OPERATION

To operate system 10, terminal 116 with RS232 serial port is set for 8-bit data, one stop bit, no parity, and any baud rate from 110 to 9,600. Cable 114 (FIG. 6) connects serial port 112 to terminal 116. Also necessary for operation is a power source of 115 volts, 60 Hz at 2 amps.

When powering the system, the screen of terminal 116 will be blank. The controller 14 requires several seconds to boot up. After waiting seven to eight seconds, the SPACE key of the terminal is pressed to initialize the serial port on the controller to match it to the baud rate of the terminal. After the SPACE key has been pressed, the screen will display "sys int". For the next several seconds, the system will be loading all of the stored data. Pressing the return key will be bring the Main Menu onto the screen.

The controller for either gripper 12 or gripper 16 has a menu-driven operating system. Each time the system is powered up or when returning from another part of the system, the Main Menu screen is displayed on the terminal 116. The Main Menu provides several fields from which to choose from namely calibrate, parts list, teach, run and exit as indicated by boxes A, B, C, D and E of FIG. 7. The exit field functions only when the optional command software module is installed in the controller 14. To call up the field of the Main Menu, it is necessary to enter the corresponding number of the field and then to press the return key of the terminal. Unless the gripper is calibrated, it is not possible to enter the teach mode.

In the calibrate mode, fingers 18 are calibrated to their closed positions. The fingers first open all of the way to the ends of their paths of travel. Then the fingers close on center. With the fingers together, they define the calibrated or "home" position. When the calibration has been completed, controller 14 then returns to the main menu screen (except during the run mode).

The parts list mode displays all of the information pertaining to the taught parts of the gripper. It is possible to teach the gripper a total of about 32 parts listed on two separate screens, 16 parts per screen. The data listed for each part includes the part number, the part grip (ID or OD) part clearance, grip force in the top part widths. After the first 15 parts have been displayed, controller 14 waits for the input to continue. Pressing the return key will display the second set of 16 parts. Pressing the return key of the terminal a second time returns the system to the Main Menu screen.

In the teach mode, information relating to each part is entered into the system and the part is taught to the gripper. Up to 32 different parts can be stored in nonvolatile memory. After selecting teach from the Main Menu, the system asks for input on the part that is to be taught to the gripper.

The first question to be taught relates to the part number. The part can be any number from 0 to 31. A negative number will exit the system back to the Main Menu screen.

The second question asks if the grip is ID (inside diameter) or OD (outside diameter). An ID grip means that the fingers approach the part from the inside position and move outwardly to grasp the part. An OD grip means that the fingers approach apart from the outside positions and move inwardly to grasp the part.

The third question asks for clearance on the part. The part clearance is a total additional offset the fingers travel to clear the part when the gripper is approaching or departing the part's location. When the grip is ID, the part clearance is subtracted from the finger opening. When the grip is OD, the part clearances added to the finger opening.

The fourth question asks for the grip force. This is a level of force for the fingers during the move and while holding the part. The grip force values can range from 0 to 100 with 100 being the maximum force. This programmable grip force allows for handling of delicate parts along with heavier objects with the same gripper.

After all required information pertaining to a particular part has been entered into the system, the system will then list all of the data and ask if the data is correct. If the answer is no, the system will start over again with the first question. If the answer is yes, the part will be taught to the gripper. With the remote pendant interface 138 (FIG. 6), it is possible to teach the part one of two ways either by jogging the fingers or by freeing them.

When jogging the fingers there are two speeds i which one can select, slow or very slow. The fingers are first moved to clear the part and the part is placed in the way of the fingers to be grasped. When this is done, the fingers are driven to grasp the part, making sure that the part is positioned correctly and being held tightly.

It is also possible to teach the part by pressing the free switch on the pendant. This action turns the servo motor off and allows the fingers to move freely throughout their travel. With the fingers limp, the part being taught is placed between the fingers. The fingers are pressed tightly to hold the part then the switch is toggled back to servo on the pendant The gripper will servo to that position.

If the remote pendant option is not provided, the fingers will go limp after the instruction on the screen had reached "teach part the gripper". The instructions stated previously, use the Free/Servo function on the pendant. After the fingers on the part have been closed the return key is pressed on the terminal. The fingers will now servo at that location.

After the fingers have been moved to grasp the part, the return key on the terminal is pressed. This stores the fingers location along with all the related data in the nonvolatile memory.

The next question relates to whether or not another part is to be taught. A "no" answer will exit the system from the teach mode and return it to the Main Menu screen. A "yes" answer will return the system to the first question at the beginning of the teach mode.

When selecting the run mode, the controller switches from the menu-driven operator interface to the digital I/O interface with the host system (robot controller). A message will appear on the terminal screens, stating that the controller is in the run mode. In this mode, the controller will accept only inputs from the digital I/O. To exit from the run mode, it is necessary to toggle the run/terminal signal bit to terminal along with setting the abort bit. The system will then return to the Main Menu screen, an emergency stop will occur, causing the gripper to go limp. The gripper will need to be calibrated to resume operations.

To drive the gripper, several bits are needed. Part bit 0, part bit 1, part bid 2, part bit 3 and part bit 4 identify the part number to be used (0 to 31). The open/closed bit calls the offset for the finger positioning. The read bit commands the controller to read all the bits, assign the part number, part grip, part clearance (if open bit it set), grip force, along with part width and to execute the move. When the controller is ready for the next move, the ready bit will be turned on. While the controller is reading the bits and executing the move, the ready bit will be turned off.

The abort bit (without the run/terminal bit, set to terminal), will stop all movements of the gripper. The gripper does not go limp and there is no need to recalibrate the gripper. The system then continues to the next read command. It is recommended that the I/O signals be set for 100 millisecond duration.

In the exit mode, the system will function only if the optional command the software module is installed. The exit mode allows the system to leave the menu-driven software and drive the gripper directly through assembly like instructions. The command software module functions only through the controllers serial port and ignores all digital I/O inputs. It is possible to enter the commands either through a terminal or a host controller.

The system can be set to Autorun in two different modes on power up. With both the run/terminal bits set to run and the calibrated bit set to run and the calibrated set, the system will enter the run mode and calibrate the gripper. It will be ready to accept read commands.

With just the run bit set, the system will enter the command software module (if installed). It is possible to then enter commands from either the robot or host system to drive the gripper. The controller does not wait for a space key to determine the band rate. The band rate is fixed at 9,600. It is possible to leave either of these modes and return to the main menu screen at any time.

As it will be understood by those familiar with the art, the present invention may be embodied in other specific forms without departing from the spirit or the essential characteristics thereof. For example, the system can be simultaneously accepting inputs of parts in subroutine B and be operated by the remote control box. Accordingly, the disclosure of the preferred embodiments of the invention is intended to be illustrated, but not limiting, of the scope of the invention which set forth in the following claims.

APPENDIX

```
>LIST
10      REM ARSI
20      REM MICRO/ONE CONTROLLER - PRECISION SERVO GRIPPER
30      REM VERSION 1.4
40      REM COPYRIGHT (C) 1987  ADVANCED ROBOTIC SYSTEMS INTEGRATION
50      REM SUNNYVALE, CA.  ALL RIGHTS RESERVED.
60      REM MODEL SG4
70      DBY(26H)=DBY(26H).OR.1H
80      GOTO 900
90      CALL 9FC0H
100     GOSUB 1500
110     FOR P=1 TO 25 :  PRINT   :  NEXT P
120     PRINT "* * * * * * * * * * * * * * * *"
130     PRINT "* ARSI                        *"
140     PRINT "* MICRO/ONE CONTROLLER        *"
150     PRINT "* PRECISION SERVO GRIPPER     *"
160     PRINT "* VERSION 1.4                 *"
170     PRINT "* COPYRIGHT (C) 1987          *"
180     PRINT "* ALL RIGHTS RESERVED         *"
190     PRINT "* * * * * * * * * * * * * * * *"
200     FOR P=1 TO 5 :  PRINT  :  NEXT P
210     INPUT "PRESS <RETURN> KEY TO CONTINUE. ",$(ANS)
300     FOR P=1 TO 25 :  PRINT  :  NEXT P
305     PRINT USING(0) :  PRINT  :  PRINT
306     ONERR 305
310     WS=0 :  PRINT
320     PRINT "           * * * * * * * * * * * * * * * * * * * * * * * * * * * * *"
325     PRINT  TAB (11),"*", SPC (55),"*"
330     PRINT "          *                                               MAIN MENU *"
335     PRINT  TAB (11),"*", SPC (55),"*"
340     PRINT "          *                                            1. CALIBRATE *"
345     PRINT  TAB (11),"*", SPC (55),"*"
350     PRINT "          *                                            2. PARTS LIST *"
355     PRINT  TAB (11),"*", SPC (55),"*"
360     PRINT "          *                                            3. TEACH     *"
365     PRINT  TAB (11),"*", SPC (55),"*"
370     PRINT "          *                                            4. RUN       *"
375     PRINT  TAB (11),"*", SPC (55),"*"
380     PRINT "          *                                            9. EXIT      *"
395     PRINT  TAB (11),"*", SPC (55),"*" : PRINT TAB (11),"*", SPC (55),"*"
400     PRINT "           * * * * * * * * * * * * * * * * * * * * * * * * * * * * *"
410     PRINT :  PRINT  :  INPUT "                               COMMAND : ",ANS
415     PRINT
420     IF ANS=9 GOTO 9000
430     IF ANS<1.OR.ANS>4 GOTO 490
```

```
440     ON ANS GOSUB 500,1000,3000,2000,4000
450     GOTO 305
490     PRINT  :  PRINT "* ERROR BAD COMMAND *" :  FOR T=1 TO 300 :  NEXT T :  GO
TO 305
500     REM READ STATUS
510     STN=0
520     SB=XBY(OFE01H)
530     IF SB/2-INT(SB/2)<>0 RETURN
540     R9=XBY(OFE00H)
550     STN=STN+1
560     IF STN>3 PRINT "* ERROR @ OFE01 *" :  RETURN
570     GOTO 520
590     RETURN
600     REM WRITE
610     GOSUB 500
620     FOR J=1 TO WN : XBY(OFE00H)=ASC($(WS),J)
650     NEXT J
660     XBY(OFE00H)=13
680     RETURN
700     REM READ
705     FOR T=1 TO 10 :  NEXT T
710     STN=0 : RERR=0 : I=0 : RN=0
720     IF STN>3 PRINT "* ERROR @OFE01H *" :  RETURN
730     SB=XBY(OFE01H)
740     IF SB/2-INT(SB/2)<>0 THEN STN=STN+1 :  GOTO 720
750     I=I+1 : R(I)=XBY(OFE00H)
770     IF R(I)=13 THEN RN=I-1
780     IF R(I)=63 GOTO 810
790     IF R(I)=58 RETURN
800     IF I<10 THEN STN=0 :  GOTO 720
810     RERR=1 :  PRINT "* ERROR @ OFE00 *" :  RETURN
900     REM SETUP
905     GOSUB 500
910     STRING 4500,40
920     DIM R(10),B(20),G(32),GF(32),PC(32),LOC(32)
925     SOG1=0 : SOG2=0 : SOG3=0 : SOG4=1 :  GOSUB 4770
930     $(WS)="RS" : WN=2 :  GOSUB 600
935     $(WS)="GN3" : WN=3 :  GOSUB 600
940     $(WS)="KI2" : WN=3 :  GOSUB 600
950     GOSUB 2700
960     RJ=XBY(OFC01H).AND.1 : CJ=XBY(OFC01H).AND.2
970     IF RJ=1.AND.CJ=2 GOTO 4000
980     IF RJ=1.AND.CJ<>2 GOTO 9000
990     GOTO 90
1000    REM CALIBRATE
1010    $(WS)="OE0" : WN=3 :  GOSUB 600
1020    $(WS)="SH" : WN=2 :  GOSUB 600
1030    $(WS)="SP10000" : WN=7 :  GOSUB 600
1040    $(WS)="IP 9999" : WN=7 :  GOSUB 600
1050    FOR T=1 TO 3000 :  NEXT T
1060    $(WS)="AB" : WN=2 :  GOSUB 600
1070    $(WS)="IP-9999" : WN=7 :  GOSUB 600
1080    FOR T=1 TO 3000 :  NEXT T
1090    $(WS)="AB" : WN=2 :  GOSUB 600
1100    $(WS)="SH" : WN=2 :  GOSUB 600
1110    $(WS)="DH" : WN=2 :  GOSUB 600
1120    $(WS)="IP15" : WN=4 :  GOSUB 600
1130    $(WS)="TL127" : WN=5 :  GOSUB 600
1140    $(WS)="SP250000" : WN=8 :  GOSUB 600
1145    $(WS)="AC3000000" : WN=9 :  GOSUB 600
1150    $(WS)="OE1" : WN=3 :  GOSUB 600
1160    CALFLAG=1
1170    SOG1=1 :  GOSUB 4770
1180    RETURN
1500    REM
1510    PRINT "sys int"
1560    KFLAG=0
1570    FOR I=1 TO 500
1580    CHAR=GET
1590    IF KFLAG=0.AND.CHAR=ASC(K) THEN KFLAG=1 :  GOTO 1610
1600    IF KFLAG=1.AND.CHAR=ASC(&) THEN DBY(26H)=DBY(26H).AND.0FEH
1610    NEXT I
1620    RETURN
```

```
2000    REM TEACH
2005    IF CALFLAG=0 PRINT : PRINT "* GRIPPER NOT CALIBRATED *" : GOTO 305
2010    FOR P=1 TO 25 : PRINT : NEXT P
2020    PRINT : PRINT : INPUT "PART NUMBER ? ",PN
2024    IF PN<0 PRINT : GOTO 305
2025    IF PN>31 GOTO 2950
2030    PRINT : PRINT : INPUT "IS THE GRIP ID(1) OR OD(2) ? ",G(PN)
2040    IF G(PN)<1.OR.G(PN)>2 GOTO 2950
2050    PRINT : INPUT "WHAT IS THE PART CLEARENCE ? ",CL
2060    PC(PN)=INT(ABS(CL)/.0003926)
2070    IF PC(PN)>40000 GOTO 2950
2080    PRINT : INPUT "WHAT IS THE GRIPPING FORCE ? ",TL
2090    IF TL<0.OR.TL>100 GOTO 2950
2110    GF(PN)=INT((TL*1.2)+7)
2120    FOR P=1 TO 25 : PRINT : NEXT P
2130    PRINT "PART NUMBER - ",PN
2140    IF G(PN)=1 PRINT : PRINT : PRINT "PART GRIP IS ID"
2150    IF G(PN)=2 PRINT : PRINT : PRINT "PART GRIP IS OD"
2160    PRINT : PRINT "PART CLEARENCE IS ",CL," INCHES "
2170    PRINT : PRINT "GRIPPING FORCE IS ",TL
2180    FOR P=1 TO 10 : PRINT : NEXT P
2190    INPUT "IS THE DATA CORRECT ? (Y OR N) ",$(ANS)
2200    IF ASC($(ANS),1)=78 THEN GOTO 2020
2210    IF ASC($(ANS),1)=89 GOTO 2230
2220    GOTO 2950
2230    PRINT : PRINT
2270    PRINT "TEACH PART TO GRIPPER. ENTER <RETURN> KEY WHEN DONE."
2280    GOSUB 2600
2290    $(WS)="SH" : WN=2 : GOSUB 600
2300    $(WS)="SP250000" : WN=8 : GOSUB 600
2310    $(WS)="TP" : WN=2 : GOSUB 600 : GOSUB 700
2350    TEC=0 : FOR K=0 TO RN
2360    IF R(RN-K)>47.AND.R(RN-K)<58 THEN EB(RN-K)=R(RN-K)-48
2370    IF R(RN-K)>64.AND.R(RN-K)<71 THEN EB(RN-K)=R(RN-K)-55
2380    EC=EB(RN-K)*(16**K)
2390    TEC=TEC+EC
2400    NEXT K
2410    LOC(PN)=TEC : GOSUB 2900
2415    IF LOC0>5500.OR.LOC0<0 GOTO 2980
2420    GOSUB 2500
2425    FOR P=1 TO 5 : PRINT : NEXT P
2430    INPUT "DO YOU WANT TO TEACH ANOTHER PART ? (Y OR N) ",$(ANS)
2435    PRINT
2440    IF ASC($(ANS),1)=89 GOTO 2000
2450    IF ASC($(ANS),1)=78 RETURN
2460    GOTO 2420
2500    REM STORE PART DATA
2510    SA=7500+(PN*15)
2520    XBY(SA)=G(PN) : XBY(SA+1)=GF(PN)
2530    P=PC(PN) : L=LOC(PN)
2540    FOR I=2 TO 6 : A=INT(P/(10**(6-I)))
2550    P=P-A*(10**(6-I)) : XBY(SA+J)=A
2560    NEXT I
2570    FOR J=7 TO 11 : B=INT(L/(10**(11-J)))
2580    L=L-B*(10**(11-J)) : XBY(SA+J)=B
2590    NEXT J
2595    GOSUB 3500 : RETURN
2600    DO
2605    A=0
2610    IF XBY(0FC01H)>7 GOSUB 2680
2620    IF XBY(0FC00H)>127 THEN $(WS)="SP150" ELSE $(WS)="SP999"
2630    WN=5 : GOSUB 600
2640    $(WS)="DF" : WN=2 : GOSUB 600
2650    A=GET : UNTIL A=13
2670    RETURN
2680    $(WS)="MO" : WN=2 : GOSUB 600
2690    DO : UNTIL XBY(0FC01H)<8
2695    $(WS)="SH" : WN=2 : GOSUB 600 : RETURN
2700    REM READ PART DATA
2710    FOR PN=0 TO 31
2720    SA=7500+(PN*15)
2730    G(PN)=XBY(SA) : GF(PN)=XBY(SA+1)
2740    TA=0 : TB=0
```

```
2750     FOR I=2 TO 6 : A=XBY(SA+I)*(10**(6-I))
2760     TA=TA+A :   NEXT I
2770     PC(PN)=TA
2780     FOR J=7 TO 11 : B=XBY(SA+J)*(10**(11-J))
2790     TB=TB+B :   NEXT J
2800     LOC(PN)=TB
2805     GOSUB 2900
2810     GOSUB 3500
2820     NEXT PN
2830     $(WS)="OE1" : WN=3 :   GOSUB 600
2850     RETURN
2900     OS=0
2910     IF G(PN)=1 THEN OS=-1
2920     IF G(PN)=2 THEN OS=1
2930     LOCO=LOC(PN)+(PC(PN)*OS)
2940     RETURN
2950     PRINT   :   PRINT   :   PRINT "* BAD INPUT - TRY AGAIN *"
2960     FOR T=1 TO 2000 :   NEXT T
2970     PRINT   :   PRINT   :   GOTO 2020
2980     PRINT   :   PRINT   :   PRINT "* ERROR OUT OF RANGE *"
2990     PRINT   :   PRINT   :   GOTO 2020
3000     REM LIST PARTS
3010     FOR P=1 TO 25 :   PRINT   :   NEXT P
3020     PRINT "PART NUMBER      GRIP      GRIP FORCE      PART CLEARENCE      PART WI
DTH"
3030     PRINT "________________________________________________________________________
__"
3040     PRINT   :   PRINT
3050     FOR PN=0 TO 31
3055     PX=PC(PN)*.0003926
3056     TX=(GF(PN)-7)/1.2
3057     IF TX<0 THEN TX=0
3060     LX=LOC(PN)*.0003926
3065     IF G(PN)=0 THEN $(G)="-"
3070     IF G(PN)=1 THEN $(G)="ID"
3080     IF G(PN)=2 THEN $(G)="OD"
3090     PRINT USING(0), TAB (4),PN, TAB (17),$(G), TAB (28),TX,USING(#.###), TAB
(44),PX, TAB (59),LX
3100     IF PN=15 GOSUB 3130 :   PRINT
3120     NEXT PN
3125     PRINT   :   PRINT
3130     PRINT   :   INPUT "ENTER <RETURN> KEY TO CONTINUE. ",$(ANS)
3140     FOR P=1 TO 5 :   PRINT   :   NEXT P
3150     RETURN
3500     VX=LOCO
3510     PT=PN+42 :   GOSUB 3700
3520     VX=LOC(PN)
3530     PT=PN+10 :   GOSUB 3700
3540     VX=GF(PN)
3550     PT=PN+74 :   GOSUB 3800
3600     RETURN
3700     $(PT)="PA"
3710     FOR I=3 TO 7 : A=INT(VX/(10**(7-I)))
3720     VX=VX-A*(10**(7-I))
3730     ASC($(PT),I)=A+48
3740     NEXT I
3750     RETURN
3800     $(PT)="TL"
3810     FOR J=3 TO 5 : B=INT(VX/(10**(5-J)))
3820     VX=VX-B*(10**(5-J))
3830     ASC($(PT),J)=B+48
3840     NEXT J
3850     RETURN
4000     REM RUN GRIPPER
4005     $(WS)="TL127" : WN=5 :   GOSUB 600
4010     FOR P=1 TO 25 :   PRINT   :   NEXT P
4020     PRINT "* EXECUTING RUN PROGRAM *"
4030     $(WS)="RD1" : WN=3 :   GOSUB 600
4040     IF CALFLAG=0 GOSUB 4900
4050     SOG3=0 : SOG2=1 :   GOSUB 4770
4100     DO :   IF (XBY(OFC01H).AND.4)=4 GOTO 4800
4110     UNTIL (XBY(OFC00H).AND.64)=64
4120     IB=XBY(OFC00H) : CO=IB.AND.32 : RD=IB.AND.64 : SP=IB.AND.128
```

```
4130  PN=IB-CO-RD-SP
4140   IF G(PN)=0 GOTO 4100
4150  SOG2=0 :  GOSUB 4770
4155  PL=PN+10 : LC=PN+42 : FL=PN+74
4160   IF CO=32 THEN WS=LC ELSE WS=PL
4170  WN=7 :  GOSUB 600
4180  WS=FL : WN=5 :  GOSUB 600
4190  WS=0
4200   GOSUB 4500
4210   DO
4220  A=XBY(OFE00H)
4230   UNTIL A=72
4280  SOG2=1 : SOG3=0 :  GOSUB 4770
4290   GOTO 4100
4500  $(WS)="BG" : WN=2 :  GOSUB 600
4510  R9=XBY(OFE00H)
4520   IF R9=58 RETURN
4530   IF R9=63 PRINT "* ERROR @ OFE00 *" : SOG3=1 :  GOSUB 4770
4540   RETURN
4770  XBY(OFC01H)=SOG1*1+SOG2*2+SOG3*4+SOG4*8
4780   RETURN
4800  $(WS)="AB" : WN=2 :  GOSUB 600
4810   IF (XBY(OFC01H).AND.1)<>1 THEN $(WS)="MO" : WN=2 :  GOSUB 600 :  GOTO 48
0
4815  $(WS)="SH" : WN=2 :  GOSUB 600
4820  SOG2=1 : SOG3=1 :  GOSUB 4770
4830   GOTO 4100
4860  SOG1=0 : SOG2=0 : SOG3=1 : SOG4=1 :  GOSUB 4770
4870  CALFLAG=0
4880   PRINT "* EMERGENCY STOP *"
4890   GOTO 305
4900   DO  :  IF (XBY(OFC01H).AND.4)=4 GOTO 4800
4910   UNTIL (XBY(OFC01H).AND.2)=2
4920   GOSUB 1000
4930  SOG1=1 : SOG2=1 : SOG3=0 : SOG4=1 :  GOSUB 4770
4940  CALFLAG=1
4950   RETURN
9000   REM COMMAND MODE
9005   PRINT USING(#.###)
9010   PRINT  : N=0 : Z=0 : $(WS)="           "
9015   INPUT ".",$(WS)
9020   IF ASC($(WS),3)>64 PRINT "* ERROR BAD SYNTAX *" :  GOTO 9010
9025   IF ASC($(WS),1)=88 PRINT  :  PRINT  :  GOTO 305
9030   FOR I=1 TO 19 : B(I)=0 :  NEXT I
9040   DO  : Z=Z+1 :  IF Z>19 PRINT "* ERROR BAD SYNTAX *" :  GOTO 9010
9050  B(Z)=ASC($(WS),Z)
9060   UNTIL B(Z)=13
9070  WN=Z-1
9080   GOSUB 600
9100   IF ASC($(WS),1)=84 GOTO 9110 ELSE  GOTO 9120
9110   IF ASC($(WS),2)=69.OR.ASC($(WS),2)=80 GOTO 9130
9120  AN=XBY(OFE00H) :  IF AN=63 PRINT "* ERROR COMMAND NOT ACCEPTED *"
9125   GOTO 9010
9130   GOSUB 700
9140  N=0 : EP=0 :  IF RERR=1 GOTO 9010
9150   FOR K=0 TO RN-1
9160   IF R(RN-K)>47.AND.R(RN-K)<58 THEN EB=R(RN-K)-48 ELSE EB=R(RN-K)-55
9170  N=EB*(16**K)
9180  EP=EP+N
9190   NEXT K
9200   IF R(1)>66 THEN EP=EP-65536
9210  POS=EP*.0003926
9220   PRINT POS
9230   GOTO 9010
9999   END
10000  FOR X=8000H TO 9FB0H : XBY(X)=OFFH
10010  FOR T=1 TO 3 :  NEXT T
10020  NEXT X

READY
>
```

I claim:

1. In a robotic system including a robot arm, a gripper assembly comprising:
a movable support;
a pair of finger mounts;
a pair of fingers coupled to respective ones of said finger mounts;
shifting means, shiftably coupling said finger mounts to said movable support, for movement of said finger mounts toward and away from each other, said shifting means including a DC servo motor having a drive shaft, and rack and pinion means, coupling said drive shaft to said finger mounts, for shifting said finger mounts toward and away from each other as a function of the rotation of said drive shaft drive shaft in opposed directions;
servo means, coupled to the servo motor for driving the finger mounts toward and away from each other, whereby a component to be moved can be gripped by said fingers; and
control means for controlling the actuation of said servo means.

2. In a system as set forth in claim 1, wherein said drive shaft is generally vertical, said rack and pinion means including racks which are movable generally in horizontal paths.

3. In a system as set forth in claim 2, further including a linear bearing for each rack, respectively, the racks being movable on the respective bearing for movement relative to the support.

4. In a system as set forth in claim 2, wherein said drive shaft of said motor is generally horizontally disposed, and further including a rotatable shaft and ball screw mounted on said movable support for movement relative thereto, one of the racks being coupled to said ball screw, and an idler pinion gear coupled to said movable support and connecting said racks together whereby the racks will move together toward and away from each other.

5. In a robotic system including a robot arm, a gripper assembly comprising:
a movable support;
a pair of finger mounts;
shifting means, shiftably coupling said finger mounts to said movable support, for movement of said finger mounts toward and away from each other, said shifting means comprising
a motor having a drive shaft,
a pinion coupled to said drive shaft,
a first rack coupled between a first side of said pinion and a first one of said finger mounts for movement of said first finger mount in a first direction, and
a second rack coupled between a second side of said pinion and a second one of said finger mounts for movement of said second finger mount in a second direction;
a pair of fingers coupled to respective ones of said finger mounts;
servo means, coupled to the motor for driving the finger mounts toward and away from each other, whereby a component to be moved can be gripped by said fingers; and control means for controlling the actuation of said servo means.

6. In a robotic system including a robot arm, a gripper assembly comprising:
a movable support;
a pair of finger mounts;
shifting means, shiftably coupling said finger mounts to said movable support, for movement of said finger mounts toward and away form each other, said shifting means comprising
a motor
a drive shaft coupled to said motor,
a ball screw mounted on said drive shaft,
a first rack coupled to said ball screw and a first one of said finger mounts for movement of said first finger mount in a first direction,
a pinion having a first side coupled to said first rack, and
a second rack coupled between a second side of said pinion and a second one of said finger mounts for movement of said second finger mount in a second direction;
a pair of fingers coupled to respective ones of said finger mounts;
servo means, coupled to the motor, for driving the finger mounts toward and away form each other whereby a component to be moved can be gripped by said fingers; and
control means for controlling the actuation of said servo means.

7. A gripper system for attachment to a robot arm comprising:
first and second fingers for grasping an object to be moved;
means, coupled to said fingers, for moving said fingers simultaneously in opposite directions;
a motor, coupled to said means for moving, for driving said means for moving;
feedback means, coupled to one of said motor and said means for moving, for providing a feedback signal corresponding to a position of said means for moving;
servo means, having an input terminal, a feedback terminal and an output terminal, for providing an output signal on said output terminal, said feedback signal being provided to said feedback terminal, said output signal having a first value if an input signal on said input terminal is greater than said feedback signal and having a second value if said input signal is less than said feedback signal;
an amplifier coupling said output terminal of said servo means to a power input of said motor;
a controller having an output coupled to said input of said servo means, said controller including a program for directing the operation of said gripper system in response to a plurality of system control signals provided to an input to said controller;
an input/output port coupled to said controller input for providing said system control signals to said controller input; and
remote control means, coupled to said controller, for directing the operation of said fingers, said remote control means including;
a servo/open switch having an open position for disabling said motor and a servo position for controlling said motor with said remote control means,
an open/close switch for providing a signal to said controller indicating a direction for said motor, and
a halt switch for stopping the operation of said motor.

8. A method for teaching the gripper system of claim 7 the finger position for a specified component comprising the steps of:
inputting a part number to said controller switching said servo/open switch into said servo position;

providing a drive input to said controller from said remote control means to drive said fingers either towards or away from each other until said component is grasped by said fingers;

providing a halt signal to said controller;

providing a return signal to said controller; and storing, in response to said return signal, a current position of said means for moving under said part number.

9. A method for teaching the gripper system of claim 7 the finger position for a specified component comprising the steps of:

inputting a part number to said controller for said specified component;

switching said servo/open switch into said open portion;

removing power from said motor;

manually moving said fingers either towards or away from each other until said component is grasped by said fingers;

providing a return signal to said controller; and storing, in response to said return signal, a current position of said means for moving under said part number.

10. A method for grasping a component which has been taught according to the method of claim 8, comprising the steps of:

inputting said part number;

providing a current position of said fingers to said controller;

comparing said current portion to said stored position for said part number;

providing a direction signal to said motor dependent upon the results of said comparison; and providing a drive signal to said motor until a current position provided by said feedback means corresponds to said stored position.

11. A method for grasping a component which has been taught according to the method of claim 9, comprising the steps of:

inputting said part number;

providing a current position of said fingers to said controller;

comparing said current position to said stored position for said part number;

providing a direction signal to said motor dependent upon the results of said comparison; and providing a drive signal to said motor until a current position provided by said feedback means corresponds to said stored position.

12. A gripper system for attachment to a robot arm comprising:

first and second fingers for grasping an object to be moved;

means, coupled to said fingers, for moving said fingers simultaneously in opposite directions, said means for moving comprising a motor, a drive shaft coupled to said motor, a pinion coupled to said drive shaft, a first rack coupled between a first side of said pinion and a first one of said finger mounts for movement of said first finger mount in a first direction, an a second rack coupled between a second side of said pinion and a second one of said finger mounts for movement of said second finger mount in a second direction;

feedback means, coupled to one of said motor and said means for moving, for providing a feedback signal corresponding to a position of said means for moving ;

servo means, having an input terminal, a feedback terminal and an output terminal, for providing an output signal on aid output terminal, said feedback signal being provided to said feedback terminal, said output signal having a first value if an input signal on said input terminal is greater than said feedback signal and having a second value if said input signal is less than said feedback signal;

an amplifier coupling said output terminal of said servo means to a power input of said motor;

a controller having an output coupled to said input of said servo means, said controller including a program for directing the operation of said gripper system in response to a plurality of system control signals providing to an input to said controller; and an input/output port coupled to said controller input for providing said system control signals to said controller input.

13. A gripper system for attachment to a robot arm comprising:

first and second fingers for grasping an object to be moved;

means, coupled to said fingers, for moving said fingers simultaneously in opposite directions, said means for moving comprising a motor, a drive shaft coupled to said motor, a ball screw mounted on said drive shaft, a first rack coupled to said ball screw and a first one of said finger mounts for movement of said first finger mount in a first direction, a pinion having a first side coupled to said first rack, ad a second rack coupled between a second side of said pinion and a second one of said finger mounts for movement of said second finger mount in a second direction;

feedback means, coupled to one of said motor and said means for moving, for providing a feedback signal corresponding to a position of said means for moving;

servo means, having an input terminal, a feedback terminal and an output terminal, for providing an output signal on said output terminal, said feedback signal being provided to said feedback terminal, said output signal having a first value if an input signal on said input terminal is greater than said feedback signal and having a second value if said input signal is less than said feedback signal;

an amplifier coupling said output terminal of said servo means to a power input of said motor;

a controller having an output coupled to said input of said servo means, said controller including a program for directing the operation of said gripper system in response to a plurality of system control signals provided to an input to said controller; and an input/output port coupled to said controller input for providing said system control signals to said controller input.

* * * * *